Jan. 29, 1952 A. BLOECHL 2,583,809
RIM TIRE LOCK
Filed Dec. 16, 1946
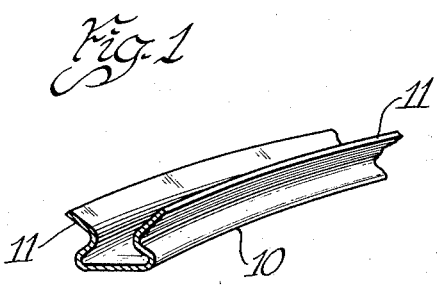
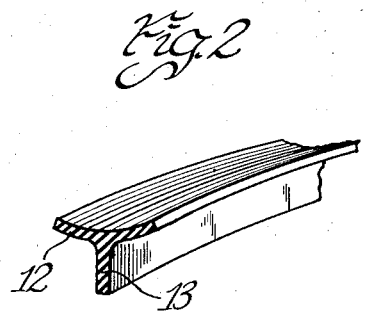
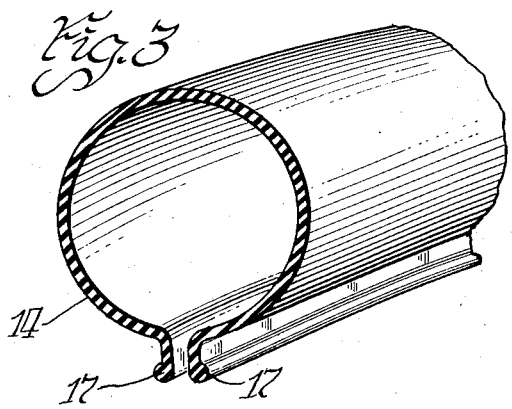
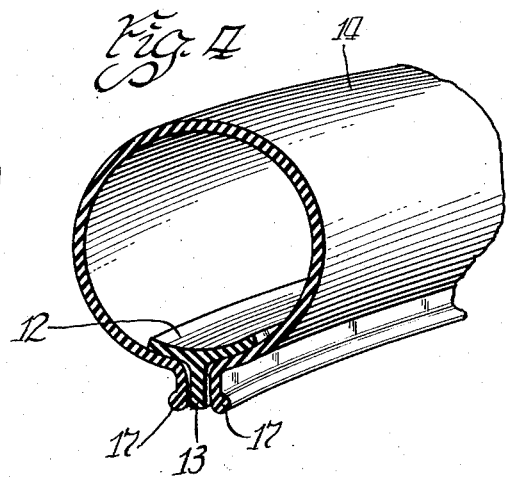
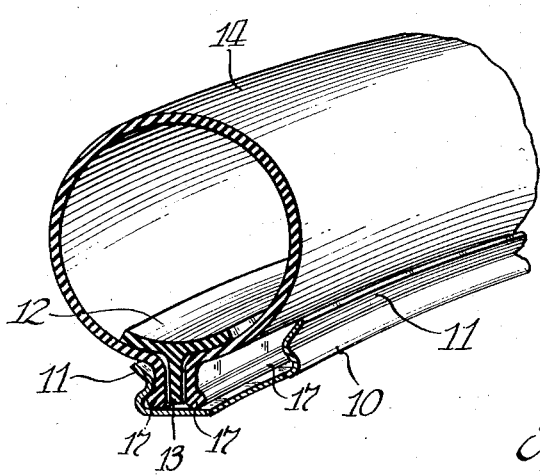
Inventor
Aloysius Bloechl Patented Jan. 29, 1952

2,583,809

UNITED STATES PATENT OFFICE 2,583,809

RIM TIRE LOCK

Aloysius Bloechl, La Porte, Ind.

Application December 16, 1946, Serial No. 716,558

3 Claims. (Cl. 152—379)

Fig. 1 is a prospective view of a segment of metal flanged rim in connection with which my invention may be used.

Fig. 2 is a perspective view of a segment of the sealing flap embodying a feature of my invention.

Fig. 3 is a perspective of a segment of my tubeless tire with the sealing flap removed.

Fig. 4 is a perspective view of a segment of my tubeless tire which in its normal shape is circular.

Fig. 5 is a perspective view of a segment of a tire rim with a fragment of my tubeless tire mounted therein.

Reference numeral 10 designates a metal grooved wheel rim which is normally circular and only a fragment of which is shown. Such rim may form either the outer portion of the wheel itself such as is normally connected spokes to a suitable hub or the same may be mounted on a hub and wheel and secured thereon in one or another conventional manner, for example by means of lugs and bolts. The outer lateral edges are bent or flared gradually outwardly to form the flanges 11, and the intermediate parts are bent closer together so that two opposed rounded beads are formed which normally frictionally engage the tire and provide an inner annular seat which is wider at its deeper portion than the space between said beads.

Numeral 12 designates a flap or liner which is made in a continuous circle and is of T-shaped cross section and includes an integral flange 13. This may be made of rubber, rubber composition, combined rubber-like material and fabric or other suitable material which functions well as a sealing medium.

As shown in Figs. 3, 4, and 5 numeral 14 designates a tire which is of circular shape as are conventional tires and which is relatively thin and preferably composed either of a rubber-impregnated fabric or of a combination of rubber reinforced with layers or plies of suitable flexible fabric. Any fabric or composite having content of a material for sealing the pores thereof so as to prevent escape of air may be satisfactorily utilized.

I desire it to be understood that the preferred form of fabric or composite material from which the casing is made has a slight degree of elasticity and which is usually sufficient so that a circular casing or tire embodying my invention may be mounted by hand over a rigid, circular, grooved rim or wheeling, a fragment of which is illustrated in Fig. 1.

Said elasticity is sufficient to cause sufficient stretch when manual force is imparted to mount the tire into a grooved rim, one form of which is illustrated in the drawings.

When the flap 12 is inserted into the tube, a suitable adhesive or sealing cement or composition is first applied either to the inner surfaces of the casing adjacent to the lateral edges of the casing or to the normally inner faces of the normally transverse flanges of the flap 12. As the flap is mounted into the position illustrated in Fig. 4 preceeding stitching, the normally inner parts of the flap and the casing are pressed together as the stitching continues, that is a short distance in advance of the stitching needle at which points the still separated lateral edges of the casing permits manual application of pressure either with a finger or suitable tool.

Said tire or causing 14 at one point thereof at or near its exposed portion is provided with a conventional type of air inlet and outlet valve such as commonly is borne on inner tubes. Such valve means permits a pumping up of the tire to the desired degree.

When air is compressed within the casing, the pressure of such air additionally presses the side portion of the flap 12 against the walls of the casing or tire, and this force continues during normal operation. I have found my construction will hold air under relatively higher pressure, for example up to 75 pounds.

While my tire construction is adapted for smaller vehicles, wheeled toys, such as tricycles, bicycles, velocipedes, go-carts, baby carriages and the like, it is especially satisfactory and has advantages in uses on bicycles, especially so-called racing bicycles where factors of relatively light weight and quick and easy changeability of the tire are important. For example, in cycle races, it is especially advantageous to be able to quickly by hand pull off a deflated or punctured tire and mount by hand another tire of my construction, thereupon introducing sufficient air thereinto for satisfactory traction and riding.

When compressed air has been built up in my tire mounted upon a grooved or flanged rim-bearing wheel, such inner pressure presses the beads 17 both into and against the rim as well as against the opposite rounded surfaces between the projecting integral flanges thereof, thereby producing considerable friction between such parts and preventing slippage of the casing.

I claim:

1. In a tire construction, a pneumatic continuous circular tubeless tire having integral substantially adjacent flat faced beads extending radially inwardly, a cloth fabric sealing and reinforcing flap having opposite lateral portions on the adjacent areas of said tire, a central integral flange on said flap and extending radially inwardly between the substantially adjacent tire beads, and stitching extending through said tire beads and through said central flange and securing said beads and said flange and sealing said tire.

2. In a pneumatic tubeless tire for wheel rims; a continuous circular flexible, stretchable and tubelike tire comprising a flexible tire having thin, flat-faced lateral and uniformly spaced edges in substantially adjacent position; a flexible T-shaped sealing flap of air-impervious material mounted against the adjacent edges of said tire and sealing the space between said edges; a flange on said flap extending between the lateral edges of said tire; and stitching securing said tire edges and said flange together.

3. In a flexible traction tubelike tire for vehicle wheels, a continuous normally circular casing comprising an air-impervious panel and having thin lateral edges permitting stitching and forming beads, and inserted pliable liner member having an intermediate projecting flange and secured against the inner wall of said casing, said flange being interposed between said beads, and stitching air-imperviously securing said beads and said liner flange together, said beads being adapted to seat in a grooved wheel rim.

ALOYSIUS BLOECHL.

REFERENCES CITED

The following references are of record in the file of this patent:

UNITED STATES PATENTS

| Number | Name | Date |
|---|---|---|
| 399,357 | Thomas | Mar. 12, 1889 |
| 509,902 | Holt | Dec. 5, 1893 |
| 516,830 | Moomy | Mar. 20, 1894 |
| 599,516 | McKnight | Feb. 22, 1898 |
| 1,258,615 | Fisher | Mar. 5, 1918 |
| 1,431,055 | Stranahan | Oct. 3, 1922 |

FOREIGN PATENTS

| Number | Country | Date |
|---|---|---|
| 17,479 | Great Britain | 1890 |
| 18,182 | Great Britain | 1891 |
| 2,782 | Great Britain | 1892 |